(12) United States Patent
Sugihara et al.

(10) Patent No.: US 12,155,943 B2
(45) Date of Patent: Nov. 26, 2024

(54) MASK SHUTTER PULSES FOR DIFFERENT EXPOSURE TIMES

(71) Applicant: CANON KABUSHIKI KAISHA, Tokyo (JP)

(72) Inventors: Kenji Sugihara, Tokyo (JP); Kei Ochiai, Tokyo (JP); Toshiyuki Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 18/155,567

(22) Filed: Jan. 17, 2023

(65) Prior Publication Data

US 2023/0254601 A1 Aug. 10, 2023

(30) Foreign Application Priority Data

Feb. 4, 2022 (JP) ................. 2022-016275

(51) Int. Cl.
*H04N 25/53* (2023.01)
*H04N 25/76* (2023.01)

(52) U.S. Cl.
CPC ............. *H04N 25/53* (2023.01); *H04N 25/76* (2023.01)

(58) Field of Classification Search
CPC ........ H04N 25/53; H04N 25/76; H04N 25/57; H04N 25/535
See application file for complete search history.

(56) References Cited

U.S. PATENT DOCUMENTS

| 10,057,521 | B1* | 8/2018 | Sanchez | ................. H04N 25/76 |
| 2017/0155844 | A1* | 6/2017 | Iso | ..................... H04N 23/6812 |
| 2020/0029007 | A1* | 1/2020 | Nishitani | ............. H04N 23/741 |

FOREIGN PATENT DOCUMENTS

JP 2021129144 A 9/2021

* cited by examiner

*Primary Examiner* — Mekonnen D Dagnew
(74) *Attorney, Agent, or Firm* — Canon U.S.A., Inc. IP Division

(57) ABSTRACT

A device that is configured to perform image capturing using a sensor for setting an exposure condition on a region-by-region basis, the device includes an issuance unit configured to issue a plurality of shutter pulses each corresponding to a different time of a plurality of exposure times, a first generation unit configured to generate a mask signal for masking of the plurality of shutter pulses in accordance with an exposure time setting of each of regions, and a second generation unit configured to generate signals to be used for each of the regions, by masking the plurality of shutter pulses in accordance with the mask signal and combining the masked plurality of shutter pulses or the plurality of shutter pulses without being masked with a read pulse.

18 Claims, 7 Drawing Sheets

FIG.7

| PARAMETER | THIS WORK | ISSCC2021 7-8 [4] | ISSCC2020 5-7 [2] | IEDM2021 30-2 [5] |
|---|---|---|---|---|
| PROCESS TECHNOLOGY | STACKED 90 nm/55 nm | STACKED 65 nm/65 nm | STACKED 65 nm/40 nm | STACKED 65 nm/45 nm |
| HDR TYPE | AREA-BY-AREA EXPOSURE | BLOCK-CONTROLLED | SUB-PIXEL | OVERFLOW-CAPACITOR |
| NO. OF PIX. | 12.6 M | 17.8 M | 5.4 M | 8.3 M |
| PIX. SIZE | 3.2 μm | 2.7 μm | 3.0 μm | 2.1 μm |
| HDR REGION SIZE | 128 × 128 PIXELS | 16 × 16 PIXELS | — | — |
| EXPOSURE CONTROLLED | INSIDE OF THE SENSOR | OUTSIDE OF THE SENSOR | — | — |
| CALC. TIME | < 1/2 FRAME | N/A | — | — |
| FRAME RATE [fps] | 60@4k3k 120@2k1k | 1000@4k4k | 40@3k2k | 45@4k2k |
| RN [e⁻rms] | 1.8 | 2.9 | 0.6 | — |
| FWC [ke⁻] | 24.8 | 7.4 | 165.8 | 600 |
| DYNAMIC RANGE [dB] | 148@30 fps 142@60 fps | 110@1k fps 134@60 fps | 132[1]@40 fps | 110[1]@45 fps |

1) PERFORMANCE AT SINGLE EXPOSURE

MASK SHUTTER PULSES FOR DIFFERENT EXPOSURE TIMES

BACKGROUND

Technical Field

The aspect of the embodiments relates to an image capturing device including a complementary metal-oxide semiconductor (CMOS) image sensor capable of region-by-region basis exposure control with which an exposure condition can be automatically determined in the image sensor in real time, an image capturing method, and a storage medium.

Description of the Related Art

There has been a growing demand for improvement in moving object recognition accuracy of image capturing devices that are used in high contrast environments. Satisfying high level security that is achieved by, for example, simultaneous recognition of a license plate and the driver and simultaneous operation of both face authentication and the background monitoring has become the need of the society. Meanwhile, the following hardware is required to achieve both high dynamic range (HDR) performance and real-time performance at the same time and to implement fast response HDR control. The hardware is a large scale hardware including, for example, a field-programmable gate array (FPGA) and a host personal computer (PC). The FPGA is disposed outside an image sensor and operates for exposure control, image composition, and evaluation. As for HDR-CMOS image sensor, Japanese Patent Application Laid-open No. 2021-129144 discusses hardware that can expand full-well capacities (FWC) of pixels and change an exposure condition on a pixel-line by pixel-line basis or a pixel-block by pixel-block basis.

In a case of a configuration in which an exposure control function is provided to a member outside an image sensor, it takes time from when an appropriate exposure condition is calculated until when the calculated exposure condition is applied, which leads to reduction in responsivity to a change in an exposure condition, and consequently, results in difficulty in image capturing, especially in moving image capturing. In a case of the realization of generally applicable edge devices, a size reduction is also demanded for the devices.

SUMMARY

According to an aspect of the embodiments, a device that is configured to perform image capturing using a sensor for setting an exposure condition on a region-by-region basis, the device includes an issuance unit configured to issue a plurality of shutter pulses each corresponding to a different time of a plurality of exposure times, a first generation unit configured to generate a mask signal for masking of the plurality of shutter pulses in accordance with an exposure time setting of each of regions, and a second generation unit configured to generate signals to be used for each of the regions, by masking the plurality of shutter pulses in accordance with the mask signal and combining the masked plurality of shutter pulses or the plurality of shutter pulses without being masked with a read pulse.

Further features of the disclosure will become apparent from the following description of exemplary embodiments with reference to the attached drawings.

BRIEF DESCRIPTION OF THE DRAWINGS

FIG. 7 is a diagram illustrating a table including a summary of performance of the image sensor according to an exemplary embodiment of the disclosure and image sensors according to prior studies.

DESCRIPTION OF THE EMBODIMENTS

Figure 1:
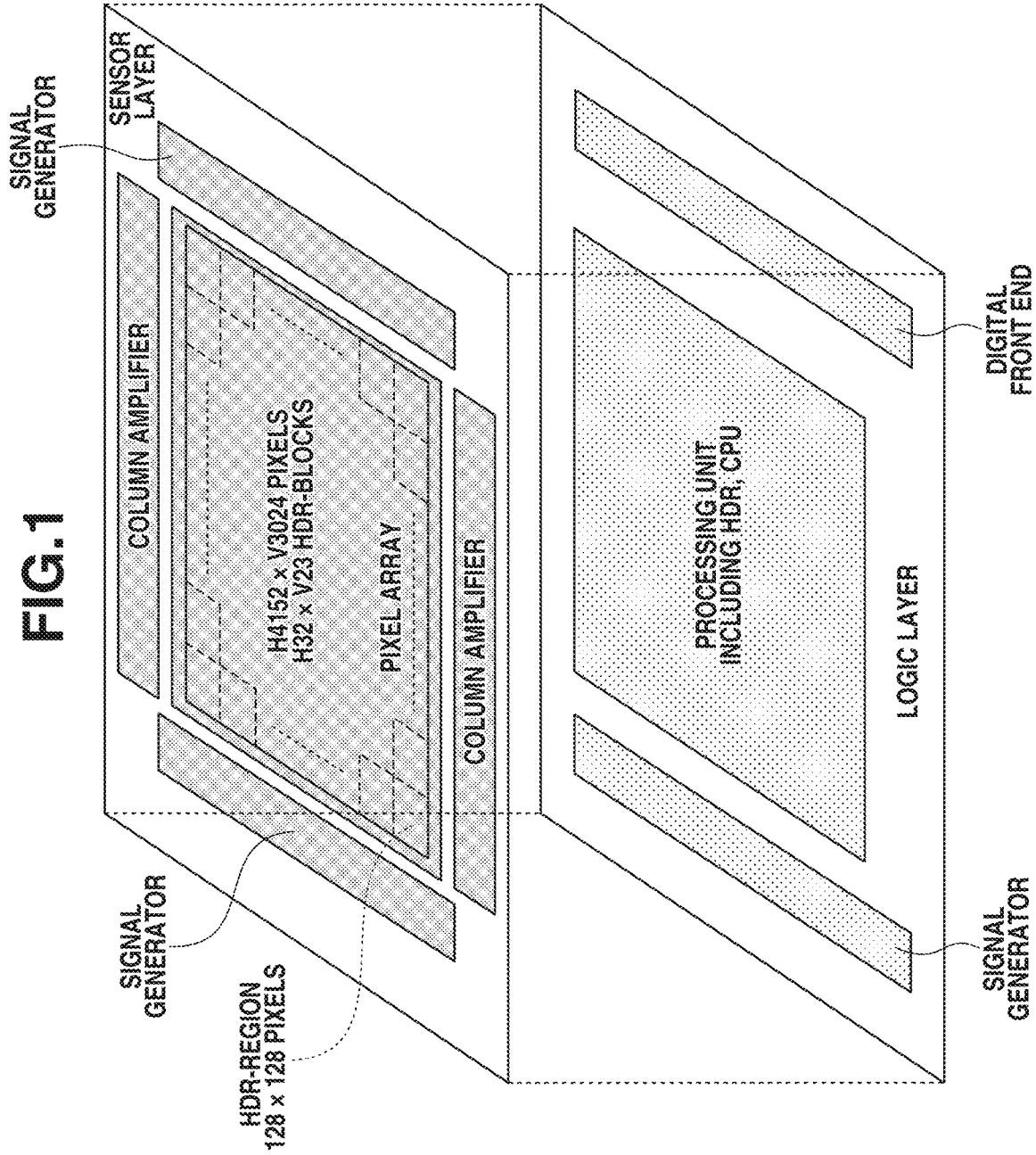
FIG. 1 is a diagram illustrating a structure of a complementary metal-oxide semiconductor (CMOS) image sensor capable of region-by-region basis exposure control.

A description will be given of an image capturing device according to an exemplary embodiment of the disclosure. The image capturing device according to the present exemplary embodiment is characterized by, in addition to high dynamic range performance, high responsivity in an exposure control. FIG. 1 is a diagram illustrating a 1.0-inch complementary metal-oxide semiconductor (CMOS) image sensor of 12.6 megapixels capable of performing autonomous control of an accumulation time and a gain on each of regions including 128×128 pixels, which is a base device of the image capturing device.

Figure 2:
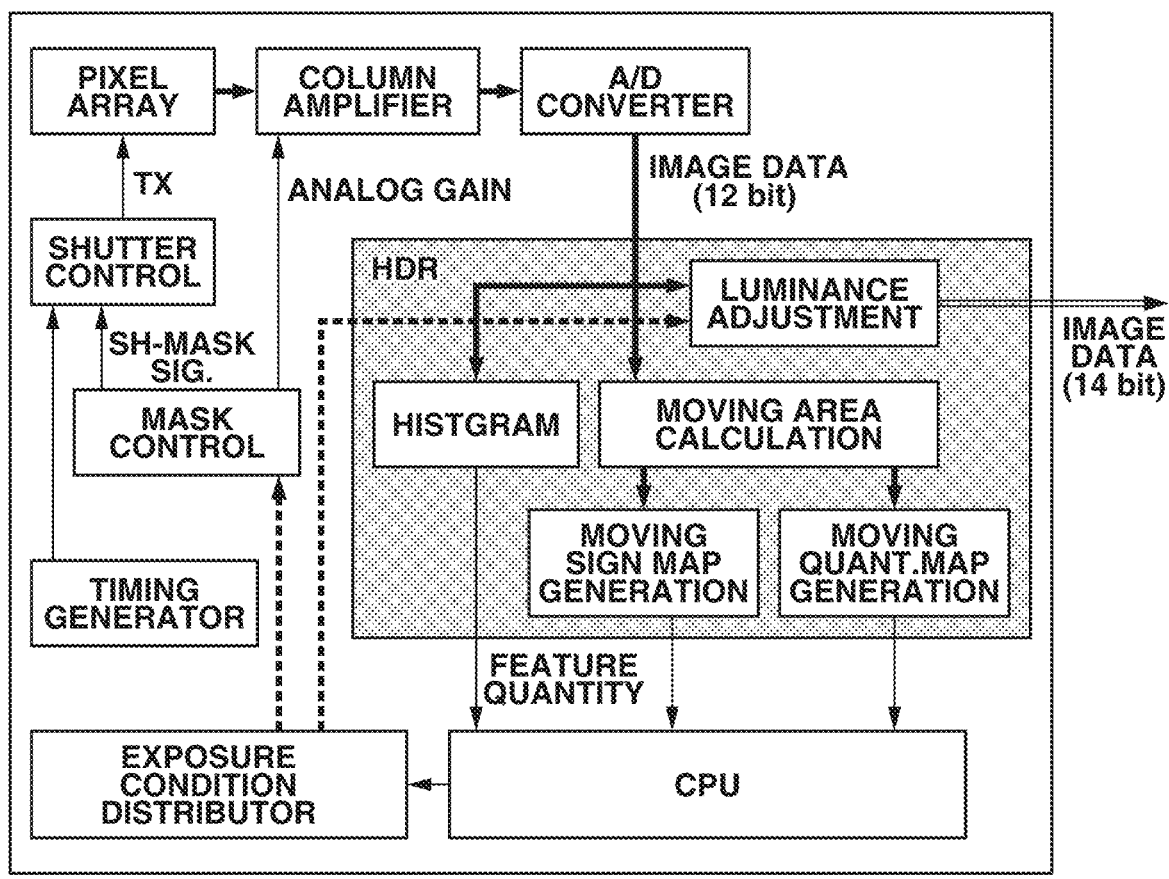
FIG. 2 is a diagram illustrating a functional block of the CMOS image sensor capable of the region-by-region basis exposure control.
Figure 3:
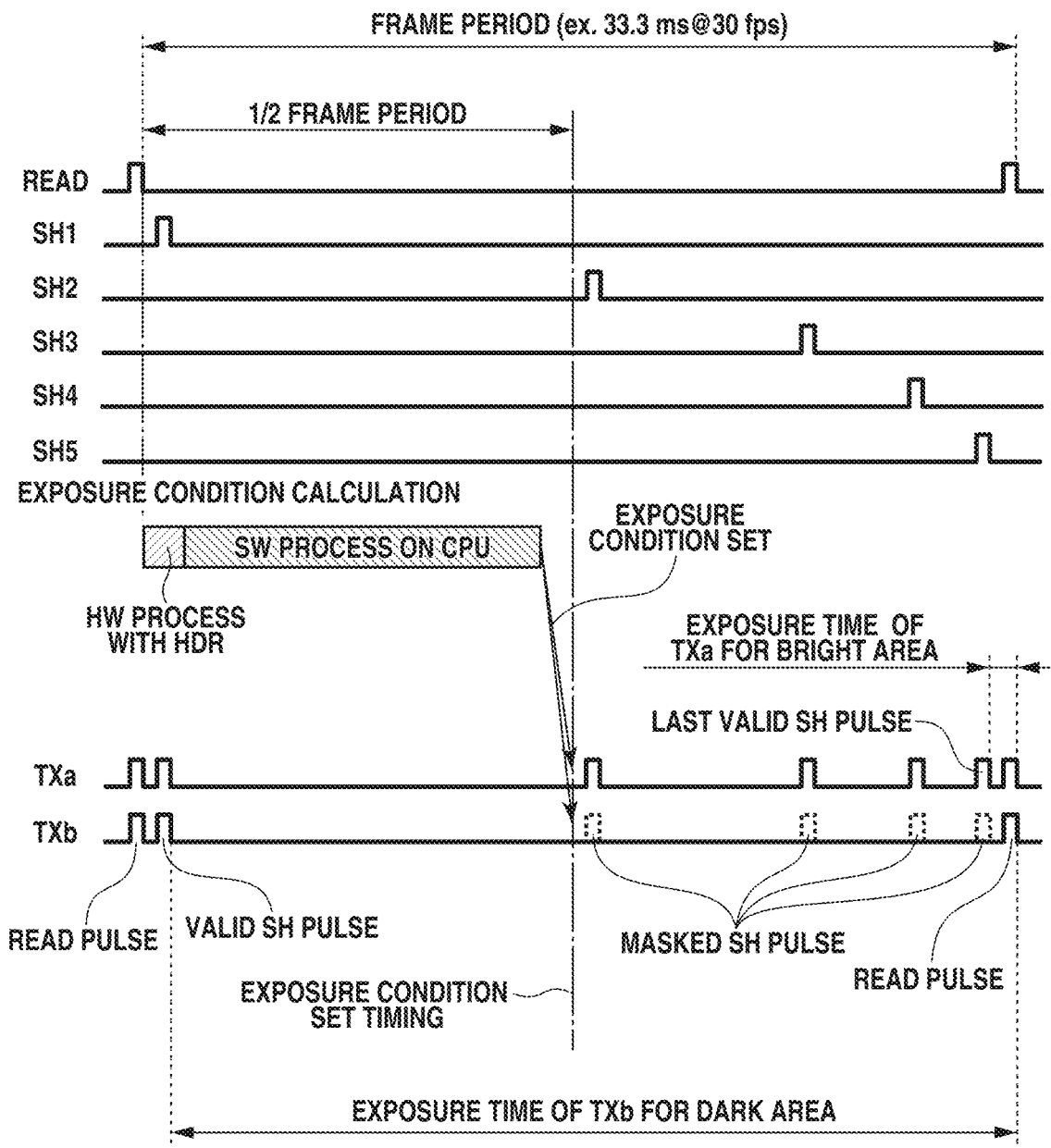
FIG. 3 is a diagram illustrating a timing chart of five-line shutter timing control.

The above-described regions are referred to as high dynamic range (HDR) control regions, and 32×23 (horizontal×vertical) HDR blocks of the HDR control regions are controlled independently from each other. A processing unit illustrated in FIG. 1 includes the HDR blocks, a central processing unit (CPU), and other units illustrated in FIG. 2. The CPU calculates an exposure condition for each of the HDR control regions. In the HDR blocks, a feature amount including moving object information is calculated from an image acquired by a pixel array. Simultaneously with the above-described calculation, the CPU mounted on the processing unit performs an exposure condition calculation, to determine an exposure condition for a next frame within a one-half (½) frame period or less. Then, the calculated exposure condition is applied to the next frame. The exposure condition is determined by selecting five patterns of electronic shutter operations (hereinafter, referred to as shutter operations, such five operations respectively corresponds to signals SH1 to SH5) from among twelve patterns, which are settable by the image sensor, and further by combining a gain of an appropriate condition selected from among four patterns of gains. The image sensor is characterized by a shutter operation control method. In mask control, mask control is performed on the shutter signals SH1 to SH5, to determine the exposure condition of each of the HDR control regions. As illustrated in FIG. 3, the shutter signal SH1 is transmitted to the pixel array after generation of timings for shutter signals SH1 to SH5 at the start of a frame, and resetting of all pixels is started. Then, during a time period from a pulse of the shutter signal SH1 to a pulse of the shutter signal SH2, the processing unit calculates an exposure condition for each of the HDR control regions and outputs a SH-mask signal from the mask control. With respect to a dark area, for example, an area B in FIG. 5, the processing unit masks pulses of the shutter signals SH2 to SH5, to generate a signal indicated as a signal TXb in FIG. 3. With respect to a bright area, for example, an area A in FIG. 5, the processing unit generates a signal indicated as a signal TXa in FIG. 3 without masking pulses of the shutter signals SH2 to SH5 and determines an exposure time based on the shutter signal SH5 which is the last valid SH pulse. By determining an exposure condition using the above-described method, brightness information obtained in a previous frame can be applied to the subsequent frame without delay. Accordingly, the image sensor that is responsive to a rapid change in brightness during moving image capturing can be realized.

A description will be given of an evaluation method according to the present exemplary embodiment.

Figure 4:
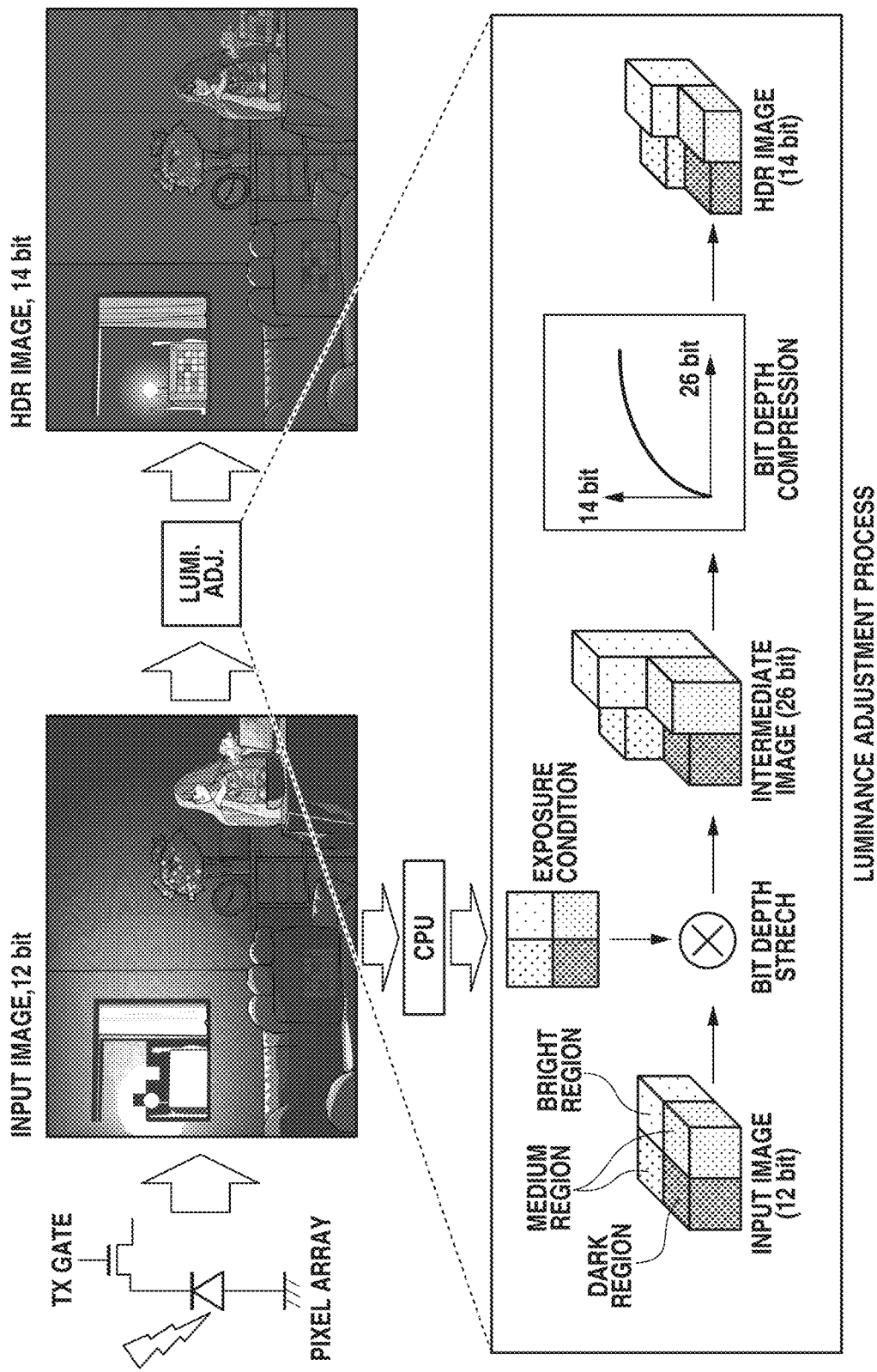
FIG. 4 is a diagram illustrating a generation process of a high dynamic range (HDR) image.
Figure 5:
FIG. 5 is a diagram illustrating a HDR image generated by a process including post processing.
Figure 6:
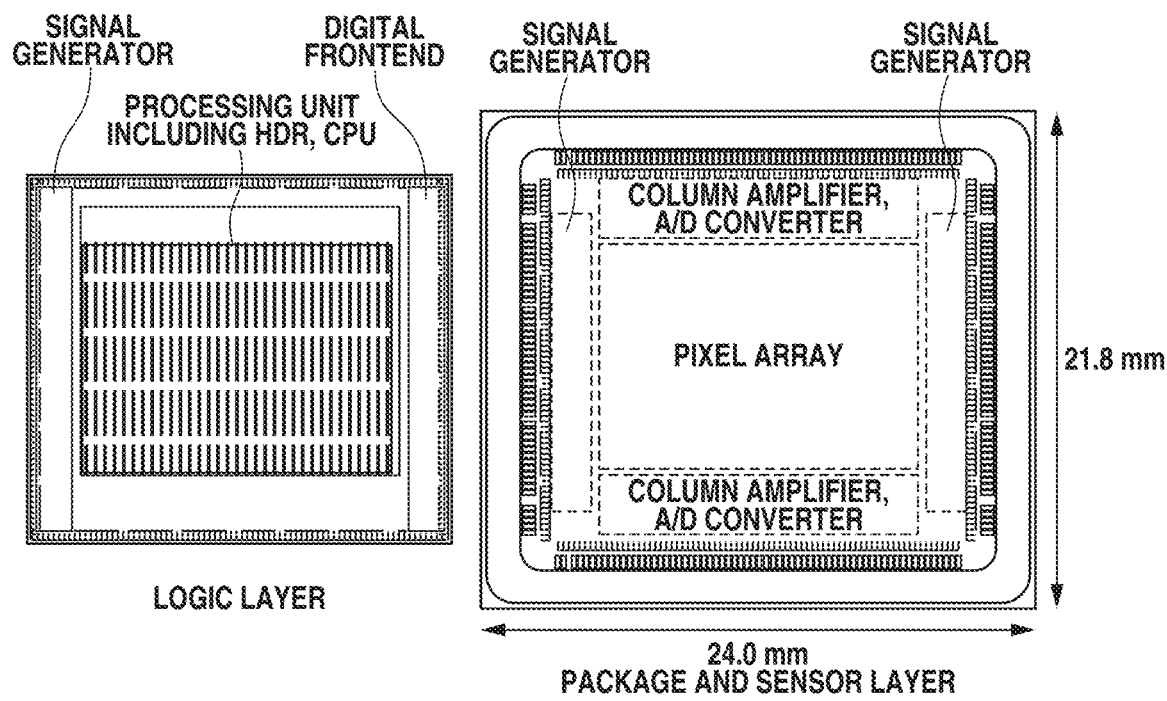
FIG. 6 is a diagram illustrating a microscope image of a semiconductor chip.

Image capturing was performed using the image capturing device including the image sensor according to the present exemplary embodiment under a simulated environment of a scene where sunlight enters a room. HDR image generation processing that is performed inside the image sensor is described with reference to FIG. 4. As illustrated in FIG. 4, the image sensor generates 26 bit image data for each of the HDR control regions from input image data of 12 bit depth, by using an exposure condition at image capturing of the image. At the end of the processing, the data is compressed by using a gamma curve, and an image of 14 bit depth is output. The image sensor set an exposure condition of the area A which is a portion of an artificial sunlight source in FIG. 5 in such a manner that the accumulation time is 1/15360 seconds and the gain is ×1, and set an exposure condition of the area B which is a portion of a chart in FIG. 5 in such a manner that the accumulation time is 1/30 seconds and the gain is ×8. Based on the set exposure conditions, a dynamic range value of the image in FIG. 5 is calculated to be 144 decibels (dB). In the basic evaluation of the image sensor of the image capturing device according to the present exemplary embodiment, the full well capacity (FWC) is 24790 e$^-$ and the dark random noise (DRN) is 1.87 e$^-$rms, whereby the dynamic range performance calculated based on the noise, the FWC, and the accumulation time achieves 148.6 dB at 30 frames per second (fps). In a case of a configuration in which an exposure control mechanism is provided to the member outside the image sensor, power consumption is increased and speeding up of an information transmission rate for shutter control and gain control is required. However, the image capturing device according to the present embodiment achieves the above-described performance with the simple configuration. The characteristics of the image sensor according to the present exemplary embodiment is summarized in the table in FIG. 7.

It was verified that the image sensor according to the present exemplary embodiment can autonomously obtain an image including both brightness and darkness information with 4000× 3000 (4k3k) resolution at 30 fps and the dynamic range performance of the image capturing device achieves 148 dB. The image sensor includes the CPU, whereby autonomous determination of an exposure condition is performable inside the image sensor and a HDR image is obtainable. The edge device that achieves high dynamic range performance and real-time recognition at the same time without complicated processing in subsequent stages was verified. Because of the simple configuration, the method according to the present exemplary embodiment can also be applied to image recognition that is performed under extreme conditions without access to a cloud computing system.

In the present exemplary embodiment, to achieve not only high dynamic range performance but also to increase real-time performance, the laminated CMOS image sensor that includes the CPU and is capable of autonomous exposure control has been prepared. Then, it is verified that an image that is obtained with 4k3k resolution at 30 fps and includes information corresponding to the dynamic range performance of 148 dB can be output in real time even under a high contrast environment.

According to the present exemplary embodiment, an edge device capable of fast response HDR control can be realized, and consequently, a contribution can be made to the field of image recognition.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-016275, filed Feb. 4, 2022, which is hereby incorporated by reference herein in its entirety.

What is claimed is:

1. A device that is configured to perform image capturing using a sensor for setting an exposure condition on a region-by-region basis, the device comprising:
   an issuance unit configured to issue a plurality of shutter pulses each corresponding to a different time of a plurality of exposure times;
   a first generation unit configured to generate a mask signal for masking of the plurality of shutter pulses in accordance with an exposure time setting of each of regions; and
   a second generation unit configured to generate signals to be used for each of the regions, by masking the plurality of shutter pulses in accordance with the mask signal and combining the masked plurality of shutter pulses or the plurality of shutter pulses without being masked with a read pulse.

2. The device according to claim 1,
wherein a shutter pulse corresponding to a longest exposure time among the plurality of exposure times is not masked, and
wherein the first generation unit generates the mask signal by a timing of when a shutter pulse corresponding to a second longest exposure time among the plurality of the shutter pulses is generated.

3. The device according to claim 2, wherein the second longest exposure time is one-half (½) or less than ½ of a longest exposure time that is determined at least based on a frame rate.

4. The device according to claim 1, wherein the first generation unit generates a mask signal for masking of a shutter pulse that corresponds to an exposure time shorter than an exposure time to be applied to each of the regions.

5. The device according to claim 1, wherein the device uses the mask signals generated by the second generation unit and a gain to perform image capturing using the sensor.

6. The device according to claim 1, wherein each of the regions includes a plurality of elements disposed in a two-dimensional array.

7. A method of image capturing using a sensor for setting an exposure condition on a region-by-region basis, the method comprising:
issuing a plurality of shutter pulses each corresponding to a different time of a plurality of exposure times;
generating, as first generating, a mask signal for masking of the plurality of shutter pulses in accordance with an exposure time setting of each of regions; and
generating, as second generating, signals to be used for each of the regions, by masking the plurality of shutter pulses in accordance with the mask signal and combining the masked plurality of shutter pulses or the plurality of shutter pulses without being masked with a read pulse.

8. The method according to claim 7,
wherein a shutter pulse corresponding to a longest exposure time among the plurality of exposure times is not masked, and
wherein the first generating generates the mask signal by a timing of when a shutter pulse corresponding to a second longest exposure time among the plurality of the shutter pulses is generated.

9. The method according to claim 8, wherein the second longest exposure time is ½ or less than ½ of a longest exposure time that is determined at least based on a frame rate.

10. The method according to claim 7, wherein the first generating generates a mask signal for masking of a shutter pulse that corresponds to an exposure time shorter than that a shutter pulse corresponding to an exposure time to be applied to each of the regions.

11. The method according to claim 7, wherein, by using the mask signals generated by the second generating and a gain, image capturing using the sensor is performed.

12. The method according to claim 7, wherein each of the regions includes a plurality of elements disposed in a two-dimensional array.

13. A non-transitory computer-readable storage medium storing instructions that, when executed by a computer, cause the computer to perform a method of image capturing using a sensor for setting an exposure condition on a region-by-region basis, the method comprising:
issuing a plurality of shutter pulses each corresponding to a different time of a plurality of exposure times;
generating, as first generating, a mask signal for masking of the plurality of shutter pulses in accordance with an exposure time setting of each of regions; and
generating, as second generating, signals to be used for each of the regions, by masking the plurality of shutter pulses in accordance with the mask signal and combining the masked plurality of shutter pulses or the plurality of shutter pulses without being masked with a read pulse.

14. The non-transitory computer-readable storage medium according to claim 13,
wherein a shutter pulse corresponding to a longest exposure time among the plurality of exposure times is not masked, and
wherein the first generating generates the mask signal by a timing of when a shutter pulse corresponding to a second longest exposure time among the plurality of the shutter pulses is generated.

15. The non-transitory computer-readable storage medium according to claim 14, wherein the second longest exposure time is ½ or less than ½ of a longest exposure time that is determined at least based on a frame rate.

16. The non-transitory computer-readable storage medium according to claim 13, wherein the first generating generates a mask signal for masking of a shutter pulse that corresponds to a exposure time shorter than that a shutter pulse corresponding to an exposure time to be applied to each of the regions.

17. The non-transitory computer-readable storage medium according to claim 13, wherein, by using the mask signals generated by the second generating and a gain, image capturing using the sensor is performed.

18. The non-transitory computer-readable storage medium according to claim 13, wherein each of the regions includes a plurality of elements disposed in a two-dimensional array.

* * * * *